United States Patent [19]

Dearhammer

[11] Patent Number: 5,606,822
[45] Date of Patent: Mar. 4, 1997

[54] PLANT-CUTTING SHEARS WITH CHEMICAL APPLICATOR

[76] Inventor: John Dearhammer, 7812 Forest Ave., Gary, Ind. 46403

[21] Appl. No.: 646,051

[22] Filed: May 7, 1996

[51] Int. Cl.$^6$ ................................................. A01G 21/00
[52] U.S. Cl. .............................................. 47/1.7; 47/1.01
[58] Field of Search ........................... 47/1 B, 1.01, 1.7, 47/1.5

[56] References Cited

U.S. PATENT DOCUMENTS

| | | |
|---|---|---|
| 773,743 | 11/1904 | Von Hoffmann . |
| 1,056,046 | 3/1913 | Myers . |
| 1,264,441 | 4/1918 | Rue . |
| 1,640,635 | 8/1927 | Atkins ................................. 47/1 B |
| 1,756,129 | 4/1930 | Nishinaka . |
| 2,747,330 | 5/1956 | Simpkins ................................ 47/1 |
| 2,846,817 | 8/1958 | Haislet ................................ 47/57.5 |
| 2,870,573 | 1/1959 | Scadden ................................ 47/1 |
| 3,002,319 | 10/1961 | Laughlin ................................ 47/57.5 |
| 4,219,963 | 9/1980 | Mullet ................................ 47/1 |
| 4,783,907 | 11/1988 | Ravaux ................................ 30/123.3 |
| 4,891,882 | 1/1990 | Bloom et al. ................................ 30/123.3 |
| 4,996,772 | 3/1991 | Iten ................................ 30/41 |
| 5,088,198 | 2/1992 | Drusiani ................................ 30/123.3 |

Primary Examiner—Terry Lee Melius
Assistant Examiner—Joanne C. Downs
Attorney, Agent, or Firm—Marshall, O'Toole, Gerstein, Murray & Borun

[57] ABSTRACT

Plant-cutting shears with a chemical applicator includes two cutting blades, each having a handle. A resilient fluid-absorptive element capable of holding a quantity of a systemic herbicide or other liquid plant-treatment chemical is provided. The chemical-holding element is mounted on the shears such that a surface of the element lies approximately in the cutting plane of the blades, but with the element isolated from fluid contact with the overlapping active areas of the blades. In operation, with a single cutting motion of the shears, a user may cut a plant and cause the resilient chemical-holding element to make direct fluid-applying physical contact with the plant wounds.

11 Claims, 2 Drawing Sheets

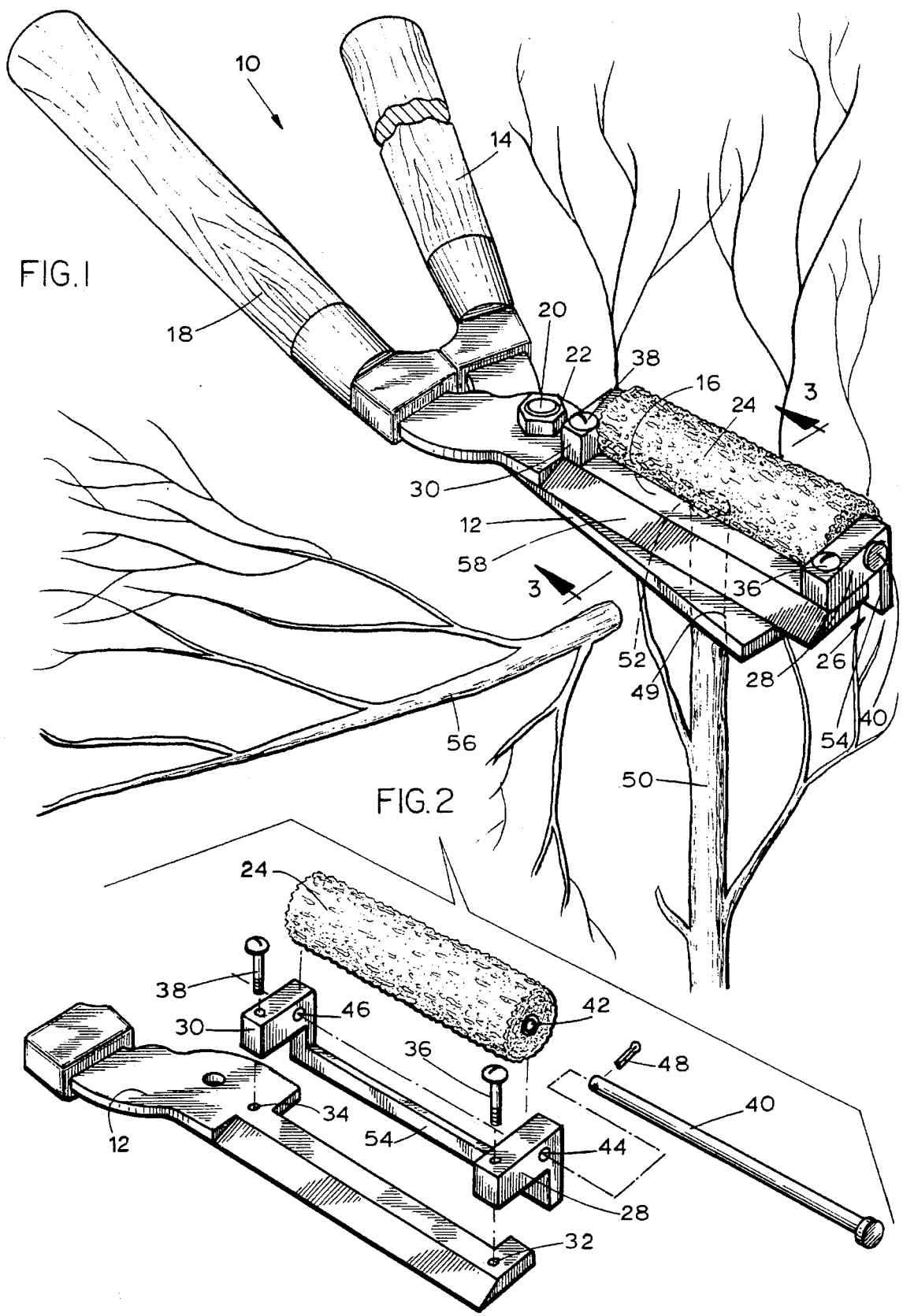

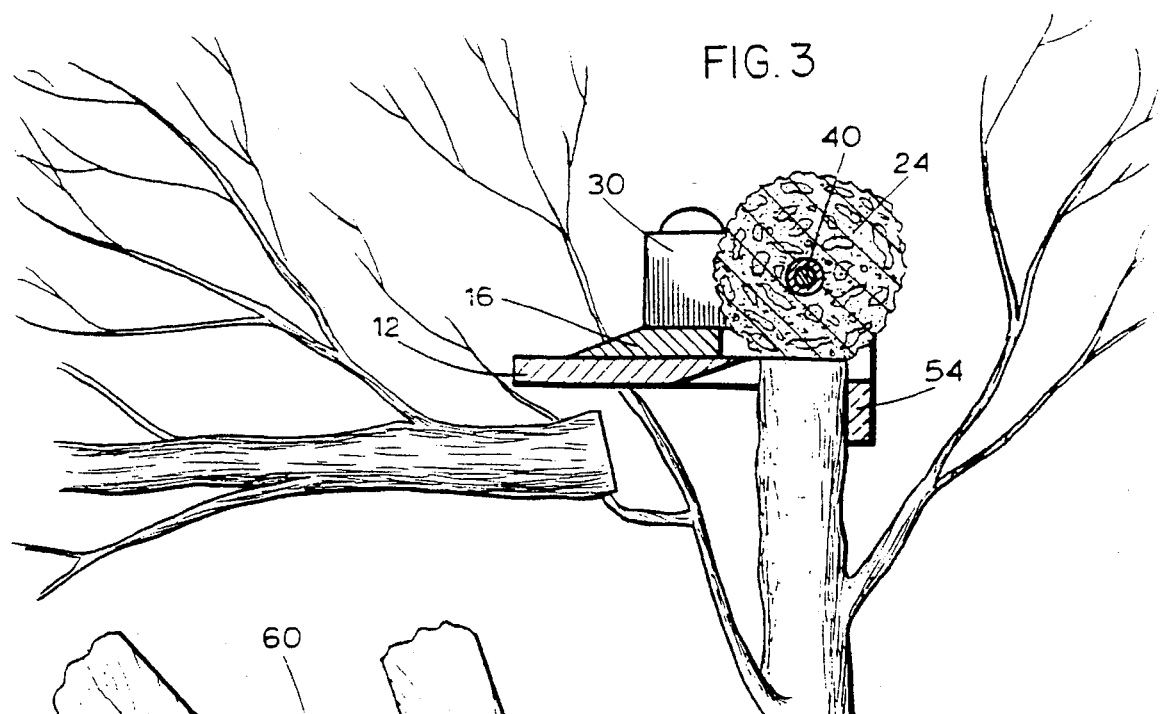
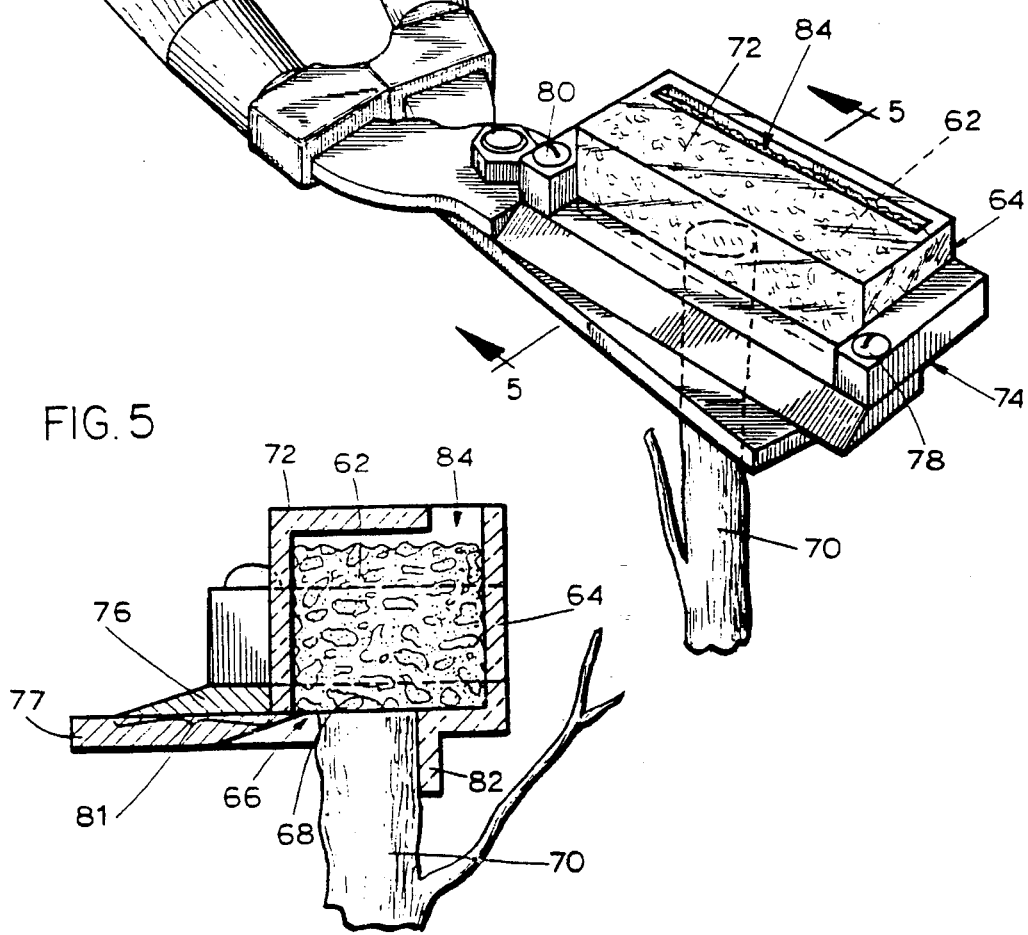

PLANT-CUTTING SHEARS WITH CHEMICAL APPLICATOR

This invention relates to plant-cutting shears, and particularly to such shears adapted for the application of systemic herbicides and other chemicals to the wounds of the plants cut.

BACKGROUND OF THE INVENTION

Invasive species of plants are infesting native areas and crowding out native plants. Among the most destructive are purple loosestrife and phragmites. Since these invasive plants have no natural enemies, they eventually take over large areas where they are unwanted.

Spraying with a herbicide is an unacceptable method of control unless 90% or more of the growth is desired to be eliminated, as spraying is non-selective and will kill all plants contacted. Selective cutting of certain species of invasive plants may restrain their growth for a time, however the control agent of choice is systemic postemergent herbicides. Systemic postemergent herbicides are drawn into the tissues of a plant, disrupting its natural function and destroying it from within. Such herbicides are commonly used on herbaceous perennial weeds or woody weeds such as the aforementioned purple loosetrife.

Systemic herbicides, however, are extremely virulent. Many postemergent herbicides are so toxic that even a small amount will kill any plant tissue it touches. Such herbicides must not be used near vegetable gardens, drainage fields, wetlands, streams or garden pools. Such chemicals can wash onto other plants, kill fish, and pollute water supplies, and can harm a tree or shrub if drawn into its roots.

Many systemic herbicides are so dangerous to use that, during an application, users are recommended to avoid drinking, smoking, eating, or touching the face. Pets and children must be removed from any area where such chemicals are to be used.

I participated in a project to remove a growth of purple loosestrife. Immediately after each plant was cut, a drop of a systemic herbicide was applied to the wound with an eye dropper. The effectiveness in killing the invasive was determined to be between 50% and 100%, depending on the thoroughness in applying the herbicide to the plant wounds. In heavy brush we found it to be difficult to locate the stumps of the just-cut plant stems and branches.

While the herbicide was determined to be effective in killing the undesired plant, the time and effort required was completely unacceptable.

A common method of applying a systemic herbicide to an individual plant is to surround the plant to be killed with scrap paper. Wearing gloves, the wounds of the cut plant are brushed with a herbicide. Care must be taken not to drip any of the chemical on the surrounding area, and not to touch any plant with the soiled paper.

Users are advised, after a systemic herbiciding operation, to wash all clothing and to shower. It is recommended that such potent herbicides be stored under lock and key.

Neither of the described methods is practical for controlling invasives forming borders, hedges, ground covers or other dense twiggy masses containing large numbers of plants, or less dense woody invasives covering large areas.

U.S. Pat. Nos. 2,870,573 (Scadden); 4,783,907 (Ravoux); 4,891,882 (Bloom et al) and 2,747,330 (Simpkins) each describe hand shears adapted for cutting a plant branch and simultaneously applying a systemic chemical to the plant wound. In each of the identified patents, the herbicide is applied to the blade or blades of the shears, rather than to the wound itself. The herbicide is transferred from the blade to the wound in successive cuts.

Such devices which indirectly apply plant treatment chemicals have a number of shortcomings. By applying the chemical to the blade surfaces, the subsequent transfer of the chemical to the plant being cut is quite ineffective, as most of the chemical is merely scraped off by the exterior surface of the branch being cut as the blades pass into the branch. Application of the chemical to the blades will cause substantial losses due to evaporation, drippage from the blades, etc. If the wasted material is a systemic herbicide, being extremely toxic, it is apt to come in contact with and possibly kill native plants and other plants desired to be protected. Drippage of such a herbicide from the blades is a serious safety threat to the user as he or she moves through the area being treated, as well as to pets and children which may frequent the treated area at the time of, or shortly after, the herbiciding operation.

Further, the shears are contaminated against use for other purposes by the inundation of the blades with a plant treatment chemical. In addition, the use of hand shears, cutting one branch at a time, is much too slow for a large area application such as a large bed of purple loosestrife or other invasives.

U.S. Pat. Nos. 773,743 (Von Hoffmann); 1,056,046 (Myers) and 5,088,198 (Drusiani) disclose hand shears in which a plant control chemical is sprayed on the plant branch wound as the branch is cut.

This class of chemical-applying hand shears suffers from many of the limitations of the afore-discussed hand shears which apply the chemical indirectly. The class of devices utilizing a chemical sprayer are more threatening to the surrounding environment and to the user due to the difficulty in controlling the spray. Wasteage is a serious problem also.

U.S. Pat. No. 4,219,963 (Mullett) depicts chemical-applying hand shears in which a plant control chemical is sprayed on the wound of the plant, independently of the cutting action. After the cut is made, the chemical dispensing nozzle is aimed at the wound and a trigger-controlled pump projects fluid in the direction in which the nozzle is aimed.

The present invention overcomes the disadvantages of the aforediscussed prior art approaches and is useful in applying systemic plant control chemicals of many types including fungicides and sterilizers as well as herbicides.

SUMMARY OF THE INVENTION

In accordance with the principles of the present invention, there is provided improved plant-cutting shears including means for applying systemic plant control chemicals directly to the wounds of just-cut plants. The shears of the present invention include a pair of cutting blades, each with a handle, connected in a scissors arrangement. A resilient fluid-absorptive element capable of holding a quantity of systemic herbicide or other liquid plant-treatment chemical is provided. The chemical-holding element is mounted on the shears such that a surface of the chemical-holding element lies approximately in the cutting plane of the blades, but with the element isolated from fluid contact with overlapping active areas of the blades. In operation, with a single cutting motion of the shears, a user may cut a plant and cause the resilient chemical-holding element to make direct fluid-applying physical contact with the just-cut plant wounds.

Thus, by this invention, the herbicide or other plant control chemical is not applied to the blades, thereby avoiding contamination and fouling of the blades. By applying the plant control chemical to, and only to, the plant wounds, wasteage of the chemical is minimized, and damage to surrounding plants and other organisms is minimized. The safety threat to the user as a result of the targeted application of the chemical only to the just-cut plant wounds is much diminished in comparison with prior methods and devices.

In accordance with another aspect of the invention, the chemical-holding element is a roller mounted for rotation. A shield may be provided around the chemical-holding element to guard the user and protected plants from contacting the element when laden with a toxic chemical.

An important aspect of the invention is a stop which is so positioned on the shears as to be adjacent to the chemical-holding element and to engage just-cut plant members which are springing back toward their home position. The stop holds the wounds of these just-cut plant members in direct liquid-transfer contact with the resilient element, assuring an efficacious application of the chemical to the plant wounds.

In an alternative embodiment of the invention, the chemical-holding element has a block geometry. Means for mounting the element includes an open-bottom tray-like container.

While the invention may be utilized in hand shears, execution of the principles of the invention is most advantageous in hedge shears. As applied to hedge shears, the chemical-holding element is of substantial length, permitting cutting and application of chemical to a large member of plant branches simultaneously. For the first time, then, by this invention a device is provided which enables systemic herbicides and other chemicals to be applied at a rapid rate to large growths of invasive plants.

Implementation of the present invention in hedge shears has the added advantage that both hands are required for operation of the shears. By this expedient, the opportunity for contaminating an unused hand is reduced.

Thus, the present invention provides improved plant-cutting shears with a chemical applicator which not only greatly increases the speed at which invasive plants can be cut and treated with a systemic plant-control chemical, but the shears of the present invention do not result in excessive wasteage of the chemical, contamination of the blades of the shears, or, in the application of a toxic herbicide, result in a serious threat to the safety of the user and surrounding plants, animals and other organisms which might be injured by the herbicide.

BRIEF DESCRIPTION OF THE DRAWINGS

The features of this invention which are believed to be novel are set forth with particularity in the claims. The invention may be best understood with reference to the following description taken in conjunction with accompanying drawings in which like reference numerals identify like elements in the several figures and in which:

FIG. 1 is a prospective view of a pair of hedge shears, as the shears would appear in use;

FIG. 2 is an exploded view of a portion of the shears shown in FIG. 1;

FIG. 3 is a sectional side elevation view of the shear shown in FIG. 1;

FIG. 4 is a view similar to FIG. 1 of an alternative embodiment of the invention; and FIG. 5 is sectional side elevation view similar to FIG. 3 of the FIG. 4 embodiment.

DETAILED DESCRIPTION

As indicated previously, the principles of this invention are applicable to hand plant-cutting shears as well as to hedge shears. FIGS. 1–3 illustrate a pair of hedge shears 10 incorporating the invention. The hedge shears 10 include a first cutting blade 12 with a handle 14 and a second cutting blade 16 with a handle 18. The first and second cutting blades 12, 16 are joined by a bolt 20 and nut 22 in a conventional scissors arrangement.

In accordance with a preferred form of the present invention, the shears 10 include a resilient fluid-absorptive element in the form of a roller 24 which is capable of holding a quantity of systemic herbicide or other liquid plant-treatment chemical.

The roller 24 is mounted for rotation by means of a bracket 26 having a pair of arms 28, 30 which are secured in threaded holes 32, 34 in the blade 16 by a pair of bolts 36, 38. A shaft 40 passes through a core 42 in the roller 24 and supports the roller for rotation. The shaft 40 is held in openings 44, 46 in the arms 28, 30 by a cotter pin 48. The roller 24 may be composed of an artificial sponge material, for example.

The bracket 26 supports the roller 24 on the shears 10 in a position such that a surface of the roller 24 lies approximately in the cutting plane of the blades 12, 16, but with the roller isolated from fluid contact with the overlapping active areas 49 of the blades 16, 18.

In accordance with an important aspect of the present invention, the shears 10 includes a stop bar 54 comprising part of the bracket 26. The stop bar 54 may be employed during a cutting-herbiciding operation to hold protected plants away from contact with the chemical-holding roller 24. More importantly, however, the stop bar 54 is so positioned adjacent the roller 24 as to engage a just-cut plant branch 50 which is springing back toward its home position, and to hold it in direct liquid-transfer contact with the chemical-laden holding roller 24. See FIG. 3.

In operation, with a single cutting motion of the shears 10, a user may cut a plant branch such as shown at 50 and cause the roller 24 to make direct fluid-applying physical contact with the plant wound, shown in phantom lines at 52.

Hedge shears 60 shown in FIGS. 4–5 represent another embodiment of the invention. In the FIGS. 4–5 embodiment, the resilient fluid-absorptive element takes the form of a block-like mass 62 which, for example, may be comprised of an artificial sponge material.

Means for mounting the chemical-holding mass 62 is illustrated as comprising an open-bottom tray-like container 64 which may be comprised, for example of a clear plastic material. An opening 66 in the bottom of the container 64 exposes the chemical-holding mass 62 to the wound 68 of a just-cut plant branch 70.

A shield portion 72 of the container 64 surrounds at least a portion of the mass 62 to protect the user and plants and other organisms in the area from contacting the chemical-holding mass 62.

A two-armed bracket 74, secured to the blade 76 of the shears 60 by bolts 78, 80, holds the container 64 securely on the shears 60. The bracket 74 supports the mass 62 approximately in the cutting plane of the blades 76, 77, but isolated from the overlapping active area 81 of the blades 76, 77.

The shears 60 includes a stop bar 82, here shown as being formed integrally with the container 64. The stop bar 82 has the same general structure and performs the same functions as the stop bar 54 constituting part of the FIGS. 1–3 embodiment discussed above.

An opening 84 in the top of the container 64 provides access to the mass 62 for chemical refill. The mass may be reloaded with plant control chemical by application of the refill chemical with an eye dropper through the opening 84.

In operation, using either the FIGS. 1–3 embodiment or the FIGS. 4–5 embodiment, after loading the chemical-holding element with the appropriate systemic plant-treatment chemical, the user simply cuts the plant with the shears in much the same manner as the shears would be used conventionally. The user will, however, pause after each cutting motion to cause the wounds of the just-cut plant branches that are trapped by the stop bar to receive an efficacious liquid-transfer direct contact with the chemical-holding element.

Another attribute of the FIGS. 1–3 embodiment is its capability of simultaneously treating the wounds of cuttings 56. As a result of the beveled cutting edge 58 on blade 16, the cutting 56 pops up and its wound contacts the chemically laden roller 24. It has been found that, in the application of a herbicide, many of the cuttings 56 receive sufficient herbicide this way to prevent their regeneration.

One eyedropper of chemical (about 0.9 ounces) will last about 10 minutes. The user will be able to refill the element with chemical in approximately 30 seconds.

It has been established that by use of the present invention, a more complete application of systemic herbicide or other plant-treatment can be made to a growth of invasive plants than is possible with prior methods and devices. The time required to accomplish the cutting and application of herbicide has been determined to be increased very substantially over the described prior method involving the use of an eye dropper to apply the chemical to the plant wounds. I have personally demonstrated a 90% reduction in the time required to cut and treat a growth of purple loosestrife using a pair of hedge shears constructed according to my invention, as compared with the afore-described method in which the chemical is applied to the plant wounds with an eye-dropper.

Thus, by the application of the present invention, plant-cutting shears are provided with which a systemic herbicide or other plant-treatment chemical can be applied to the wounds of the just cut plants, efficaciously rapidly, and with significantly reduced exposure to protected plants. Safety to the user and to pets and children is improved, as is the danger to ground water supplies, pools and other aqueous reservoirs which could be threatened by misapplication of a toxic herbicide.

The afore-discussed problems attending devices which apply the chemical directly to the blades is eliminated, thus avoiding contamination of the shears by the chemical. Waste of the plant treatment chemical is minimized by the invention, as the wounds, and only the wounds, of the cut plants receive application of the chemical.

While this invention has been particularly shown and described with reference to preferred embodiments in the form of hedge shears, it will be understood by those skilled in the art that various changes in form and details may be made without departing from the spirit and scope of the invention as defined in the appended claims. For example, the principles of the present invention may be applied to hand shears. In the embodiment of FIGS. 1–3 the roller 24 may be enclosed with a shield such as the shield 72 depicted in the FIGS. 4–5 embodiment. Means other than as shown may be provided for supplying refill chemical to the chemical-holding element. This description is to be considered as illustrative only, and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. Plant-cutting shears with chemical applicator, comprising:

first and second cutting blades, each with a handle, connected in a scissors arrangement;

a resilient fluid-absorptive element capable of holding a quantity of a systemic herbicide or other liquid plant-treatment chemical; and means for mounting said chemical-holding element on the shears such that a surface of said chemical-holding element lies approximately in the cutting plane of said blades, but with said element isolated from fluid contact with overlapping active areas of said blades, whereby in operation, with a single cutting motion of the shears, a user may cut a plant and cause the resilient chemical-holding element to make direct fluid-applying physical contact with the plant wounds.

2. The plant-cutting shears of claim 1 wherein said resilient chemical-holding element is a roller, and wherein said means for mounting includes means for supporting the roller for rotation.

3. The plant-cutting shears of claim 1 wherein said resilient chemical-holding element has a block geometry, and wherein said means for mounting includes an open-bottom tray-like container for holding said element.

4. The plant-cutting shears of claim 1 including a shield surrounding at least a part of the chemical-holding element for guarding the user and protected plants from contacting the chemical-holding element.

5. The plant-cutting shears of claim 1 including a stop so positioned adjacent the resilient chemical-holding element as to engage just-cut plant members which are snapping back toward their home position, and hold them in liquid-transfer contact with the resilient element.

6. Hedge shears with chemical applicator, comprising:

first and second elongated cutting blades, each with a handle, connected in a scissors arrangement and adapted for two-handed operation;

a resilient fluid-absorptive roller capable of holding a quantity of a systemic herbicide or other liquid plant-treatment chemical; and means for rotatably mounting said chemical-holding roller on one of said blades such that a surface of said roller lies approximately in the cutting plane of said blades, but with said roller isolated from fluid contact with overlapping active areas of said blades, whereby in operation, with a single cutting motion of the shears, a user may cut a plant and cause the roller to make direct fluid-applying physical contact with the plant wounds.

7. The hedge shears of claim 6 including a stop so positioned adjacent the chemical-holding roller as to engage just-cut plant members which are snapping back toward their home position, and hold them in liquid-transfer contact with the roller.

8. Hedge shears with chemical applicator, comprising:

first and second elongated cutting blades, each with a handle, connected in a scissors arrangement and adapted for two-handed operation;

a resilient fluid-absorptive mass capable of holding a quantity of a systemic herbicide or other liquid plant-treatment chemical; and means for mounting said chemical-holding mass on one of the blades of the shears such that a surface of said mass lies approximately in the cutting plane of said blades, but with said mass isolated from fluid contact with overlapping active areas of said blades, whereby in operation, with a single cutting motion of the shears, a user may cut a plant and cause the resilient chemical-holding mass to make direct fluid-applying physical contact with the plant wounds.

9. The hedge shears of claim 6 including a stop so positioned adjacent the resilient chemical-holding mass as to engage just-cut plant members which are snapping back toward their home position, and hold them in direct liquid-transfer contact with the mass.

10. The hedge shears of claim 9 including a shield surrounding at least a part of the chemical-holding mass for guarding the user and protected plants from contacting the mass.

11. The hedge shears of claim 10 wherein said resilient chemical-holding mass has a block geometry, and wherein said means for mounting includes an open bottom tray-like container for holding said mass.

* * * * *